United States Patent [19]

Boyer

[11] 4,374,490

[45] Feb. 22, 1983

[54] HAM SLICING MACHINE

[76] Inventor: Michael R. Boyer, 3405 Cranberry, North Street, Mich. 48049

[21] Appl. No.: 196,783

[22] Filed: Oct. 14, 1980

[51] Int. Cl.$^3$ .................................... A23N 7/00

[52] U.S. Cl. .................................... 99/538; 99/589; 99/595

[58] Field of Search ................ 99/537, 538, 541, 593, 99/594, 491, 492, 567, 595–599, 589; 82/48, 99 R, 101, 102, 70.1

[56] References Cited

U.S. PATENT DOCUMENTS

| | | | |
|---|---|---|---|
| 2,056,843 | 10/1936 | Erro | 99/595 |
| 2,599,328 | 6/1952 | Hoenselaar | 99/537 |
| 3,916,737 | 11/1975 | Libicki | 82/101 |
| 4,170,174 | 10/1979 | Ditty et al. | 99/538 |

FOREIGN PATENT DOCUMENTS

| | | | |
|---|---|---|---|
| 2037147 | 7/1980 | United Kingdom | 99/594 |

*Primary Examiner*—Philip R. Coe
*Assistant Examiner*—Timothy F. Simone
*Attorney, Agent, or Firm*—Joseph W. Farley

[57] ABSTRACT

A machine for spirally slicing an unboned ham mounted between a non-driven ham engaging member and a driven ham engaging member attached to a feed screw supported by a nut fixed to the machine frame. A drive motor connected to the feed screw is mounted in a housing movable linearly with the feed screw and a support connects the non-driven ham engaging member to the housing for movement therewith. A reciprocatably driven slicing knife is mounted on a table which is movable linearly and transversely to the longitudinal axis of the feed screw between non-working and working positions and which is resiliently biased in the working position to permit automatic positional compensation of the slicing knife for eccentricity of ham rotation and irregularity in the shape of the ham.

11 Claims, 8 Drawing Figures

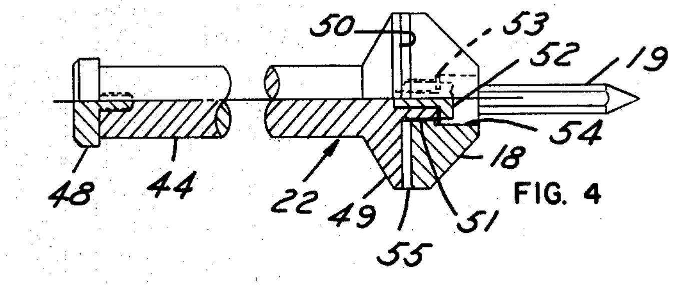
FIG. 4
FIG. 5
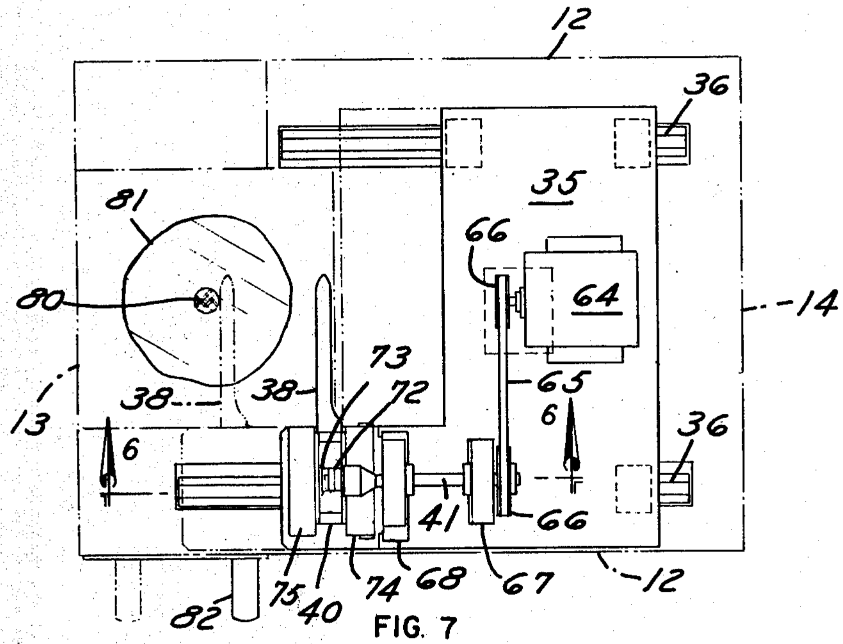
FIG. 7
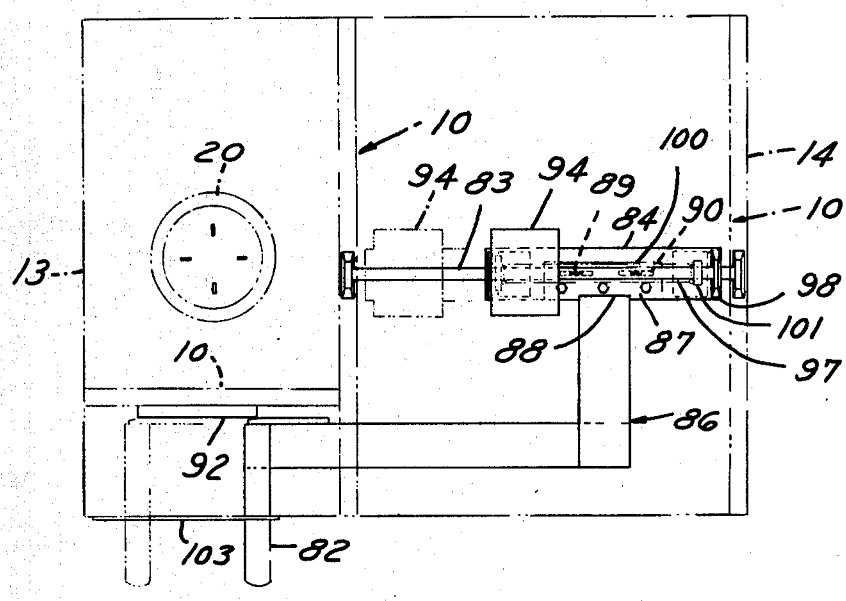

HAM SLICING MACHINE

This invention relates to an improved machine for spirally slicing an unboned ham.

Reference is made to U.S. Pat. Nos. 2,470,078 and 2,599,328, respectively issued May 10, 1949 and June 3, 1952 to H. J. Hoenselaar and disclosing apparatus wherein an unboned ham is spirally sliced by being simultaneously rotated and moved along the axis of rotation while a slicing knife engages the ham in a direction transversely to the axis of rotation. The slicing knife forms a spiral cut in the ham around the long or leg bone which is located substantially on the axis of rotation during the slicing operation.

Other forms of apparatus for spirally slicing a ham are shown in U.S. Pat. No. 3,153,436, issued Oct. 20, 1964 to R. G. Chesley, and in U.S. Pat. No. 4,050,370, issued Sept. 27, 1977 to L. C. Schmidt et al. In each of these patents the ham is rotated while the slicing knife is simultaneously moved both longitudinally and transversely of the axis of rotation during a slicing operation.

The present invention relates generally to a slicing machine of the type of the Hoenselaar patents identified above in the sense that the ham is simultaneously rotated and moved along the axis of rotation during a slicing operation. The invention provides an improved mechanism for positively supporting and driving the ham, improved support for and positioning of the slicing knife; and in general a slicing machine whose construction and operation satisfy sanitary standards required for meat processing operations.

According to the invention, a ham slicing machine includes a frame, ham mounting means, driving means including a rotatable feed screw carried by the frame for simultaneously rotating and moving the ham mounting means longitudinally of the axis of rotation of the feed screw, and a reciprocatable slicing knife supported by the frame for movement transversely of the axis of rotation of the feed screw into engagement with the ham during the rotating and longitudinal movements thereof. A slicing table is slidably supported on guide means carried by the frame for linear movement in a direction transverse to the axis of rotation of the feed screw between working and non-working positions relative to the ham; means are mounted on the slicing table for supporting and reciprocatably driving the slicing knife in directions transverse to the direction of linear movement of the slicing table; operating means are provided for moving the slicing table between the working and non-working positions thereof, and, motion transmitting means act between the operating means and the slicing table for resiliently urging the slicing table to the working position in response to movement of the operating means to the working position.

The operating means preferably comprises a plate having an operating handle connected thereto and slidably supported by the frame for movement parallel to the linear movement of the slicing table. The motion transmitting means comprises a motion transmitting member secured to the slicing table, an abutment carried by the plate and engageable with the motion transmitting member in response to movement of the plate toward the non-working position, a spring, and spring supporting means carried by the plate for transmitting movement of the plate toward the working position to the motion transmitting member through the spring. This arrangement enables the slicing table to be positively moved to non-working position, and to be resiliently moved to working position and resiliently retained therein.

The preferred arrangement for positively supporting and driving the ham includes a nut fixedly carried by the frame for supporting the feed screw, a driving motor coupled to the feed screw, and a motor supporting housing which is movable linearly on guides carried by the frame in a direction axially of the feed screw in response to rotation of the feed screw by the driving motor. The ham is mounted between a driven ham-engaging member attached to the feed screw and a non-driven ham-engaging member which is carried by supporting means linearly movable axially of the feed screw with the motor supporting member, the non-driven ham-engaging member being rotatably connected to a shaft which is carried by the supporting means in axial alignment with the feed screw and which is adjustably positionable axially relative thereto. With this arrangement, the driving motor and the ham mounting means move in unison axially with the feed screw and the ham is positively gripped at all times between the driven and non-driven ham-engaging members during a slicing operation.

Other features and advantages of the invention will appear from the description to follow of the presently preferred embodiment thereof disclosed in the accompanying drawings, in which:

FIG. 4 is an enlarged sectional detail, taken on the line 4—4 of FIG. 2, of a non-driven ham engaging assembly for supporting the upper end of a ham;

FIG. 5 is a plan view taken as indicated by the line 5—5 of FIG. 1 showing the slicing table of the machine;

FIG. 7 is a sectional plan view taken on the line 7—7 of FIG. 2 showing operating means for moving the slicing table between non-working and working positions and for resiliently biasing the table to the latter position; and, FIG. 8 is a side elevation taken as indicated by the arrows 8—8 of FIG. 2 showing the structure of FIG. 7 on an enlarged scale.

Figure 1:
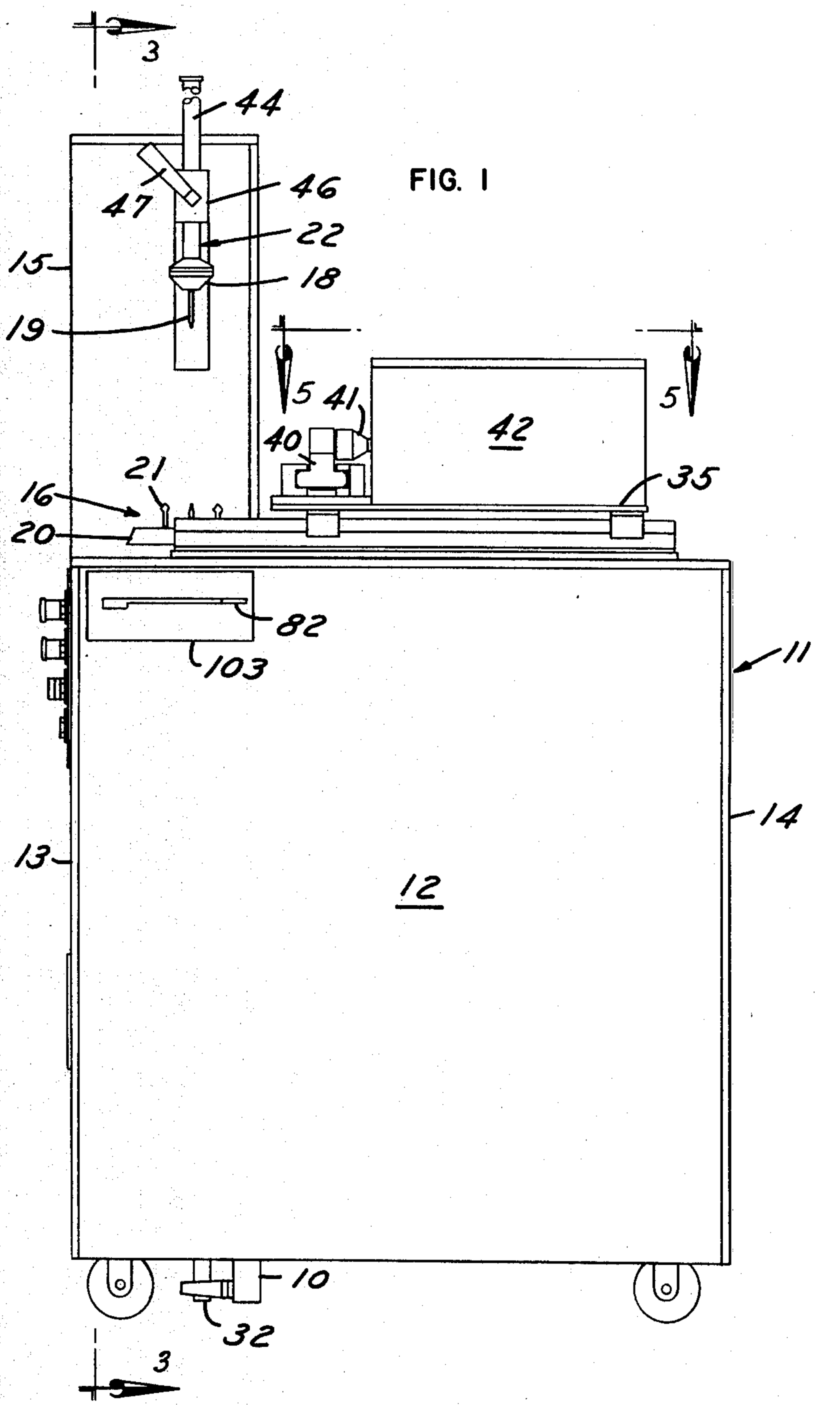
FIG. 1 is a side elevation of a ham slicing machine of the invention.
Figure 2:
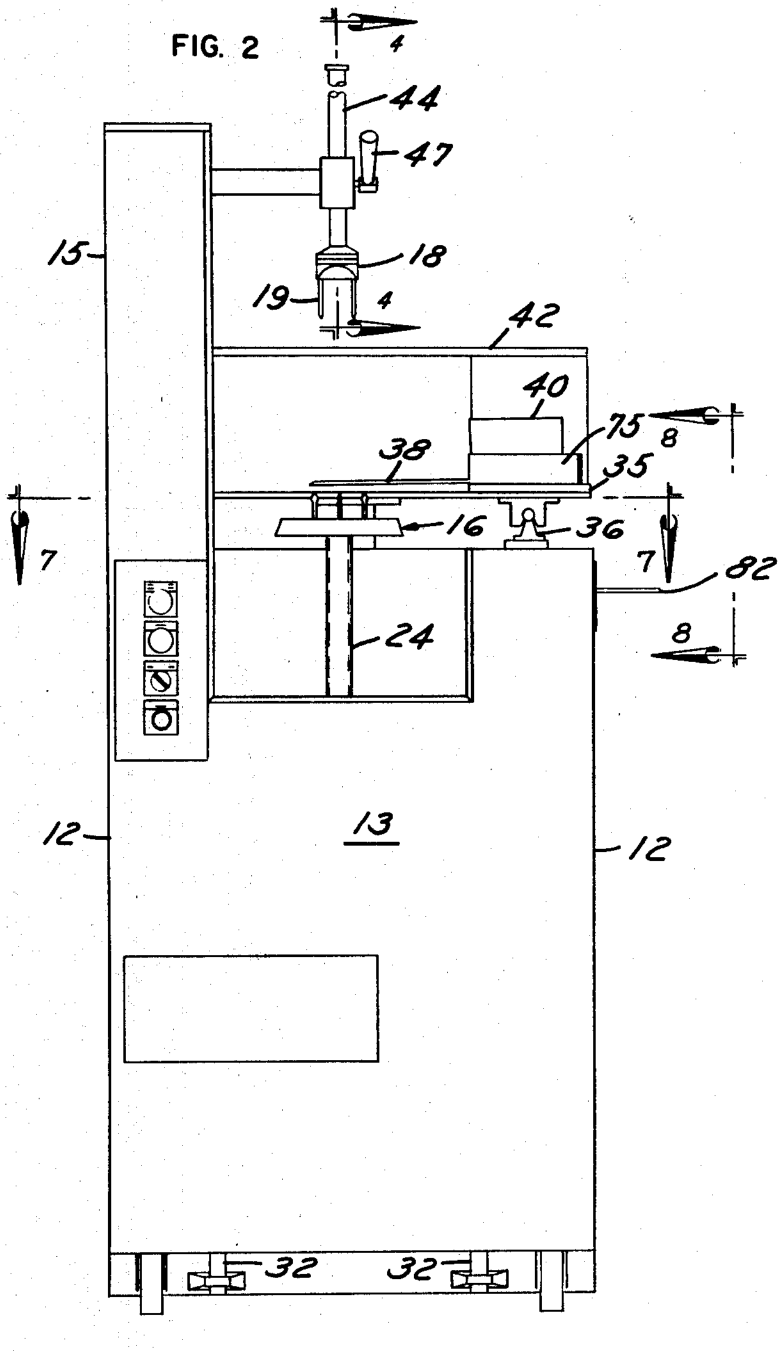
FIG. 2 is an elevation showing the left-hand end of the machine as seen in FIG. 1.
Figure 3:
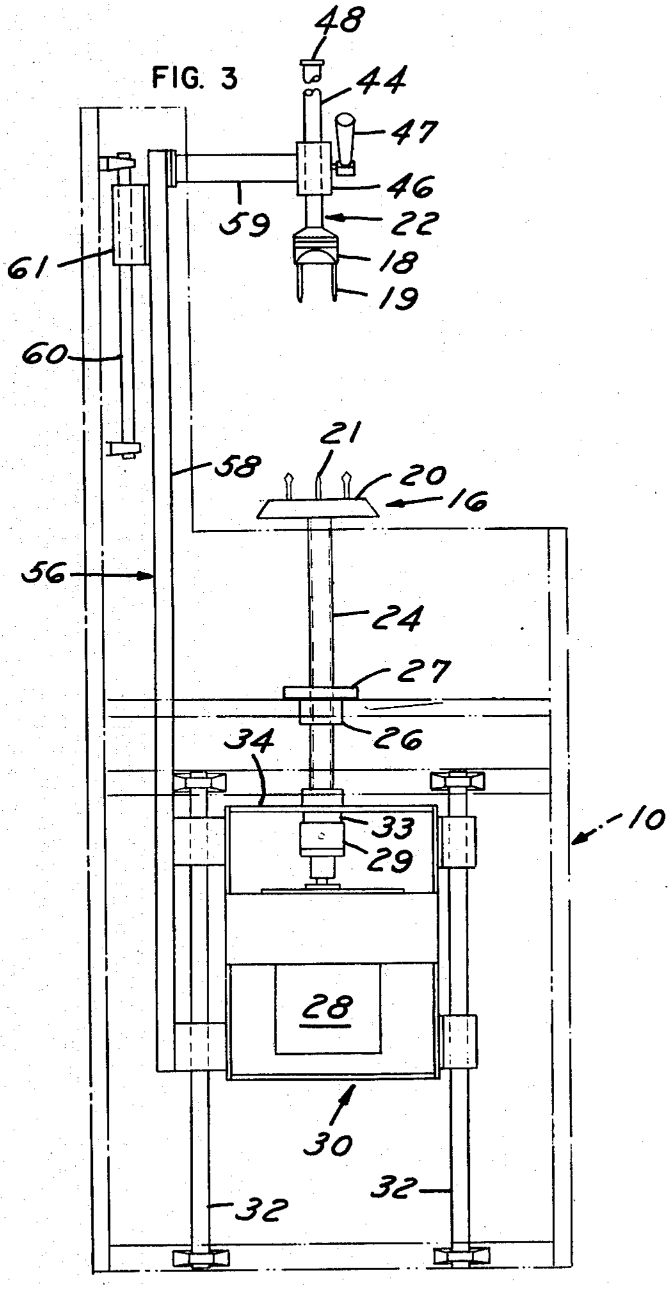
FIG. 3 is a sectional elevation taken as indicated by the line 3—3 of FIG. 1.

A general description of the slicing machine of the invention will be given with reference to FIGS. 1-3. A suitable frame 10, formed of interconnected horizontal and vertical members indicated in broken line in FIG. 3 is encased by a cabinet 11 having sides 12, an operating or front end 13, a rear end 14, and a pedestal 15 which projects upwardly at the left front corner as shown in FIGS. 1 and 2. Ham mounting means comprises a lower, driven ham engaging member 16 and an upper, non-driven ham engaging member 18. The driven member is in the form of a platter 20 having upwardly projecting prongs 21 for engaging a ham; the non-driven member 18 has a pair of downwardly projecting ham engaging prongs 19 and is rotatably carried by an adjustably mounted assembly 22 shown in FIG. 4 and to be described hereafter. A ham to be sliced is mounted between the driven and non-driven members 16 and 18 as centers of rotation in the manner disclosed in the Hoenselaar patents with the large end of the ham resting on the platter 20 and engaged by the prongs 21 and with the smaller end of the ham engaged by the prongs 19 of the upper member 18; the long bone of the ham extending generally axially between the upper and lower ham engaging members.

Driving means for simultaneously rotating and moving the ham mounting means longitudinally of the axis of rotation includes a feed screw 24 (FIG. 3) to the upper end of which the driven ham engaging member 16 is connected, a nut 26 fixed to the frame 10 by an adapter plate 27 and rotatably supporting the feed screw 24, and a driving motor 28 connected to the feed screw 24 by a two-piece motor coupling 29, the upper half of which is pinned to the feed screw 24 and the lower half of which is keyed to the motor shaft 31. The motor 28 is supported by a housing 30, and a pair of parallel guides 32 carried by the frame 10 mount the housing 30 for linear movement axially with the feed screw 24 in response to rotation of the feed screw by the motor 28. A thrust bearing 33 supports the housing 30 vertically and is mounted between the coupling 29 and a horizontal member 34 of the housing.

A slicing table 35 is slidably supported on guide means 36 carried by the frame 10 for linear movement in a direction transverse to the axis of rotation of the feed screw 24 between working and non-working positions, the latter position being shown in FIG. 1. A slicing knife 38 is connected to an inverted T-shaped block 40 (FIG. 1) which is reciprocated by a shaft 41 driven by a motor contained within an enclosure 42 and mounted on the slicing table 35.

Further details of the ham mounting means appear in FIGS. 3 and 4. The upper ham engaging assembly 22 includes a shaft 44 which is adjustably positioned in a collar 46 and locked in place by a handle 47. A stop 48 is detachably connected to the upper end of the shaft 44 and prevents the assembly from falling out of the collar 46. The lower end of the shaft 44 is formed with an enlarged portion 49 having an annular radial bearing surface 50 and a cylindrical pilot bearing surface 51. Corresponding bearing surfaces are provided on the non-driven ham engaging member 18 and a bolt 52 and washer 53, fitted in an axial recess 54 in the member 18, connect it to the shaft 44 with a thrust washer 55 interposed between the radial bearing surfaces. Clearance is provided between the washer 53 and the bottom of the recess 54 to insure that the member 18 is freely rotatable on the shaft 44.

The collar 46 and locking handle 47 form part of supporting means 56 (FIG. 3) which are movable linearly with the motor supporting housing 30 and which include a collar support formed by a vertical member 58 connected to the housing 30 and a horizontal member 59 connected to the collar 46. A guide rod 60 mounted on the frame 10 is engaged by a bearing 61 attached to the vertical member 58. Thus the supporting means 56 enables the non-driven ham engaging member 18 to be positioned in a desired spaced relation with the driven ham-engaging member 16 for mounting a ham therebetween and maintains this desired spaced relation during a slicing operation.

Figure 6:
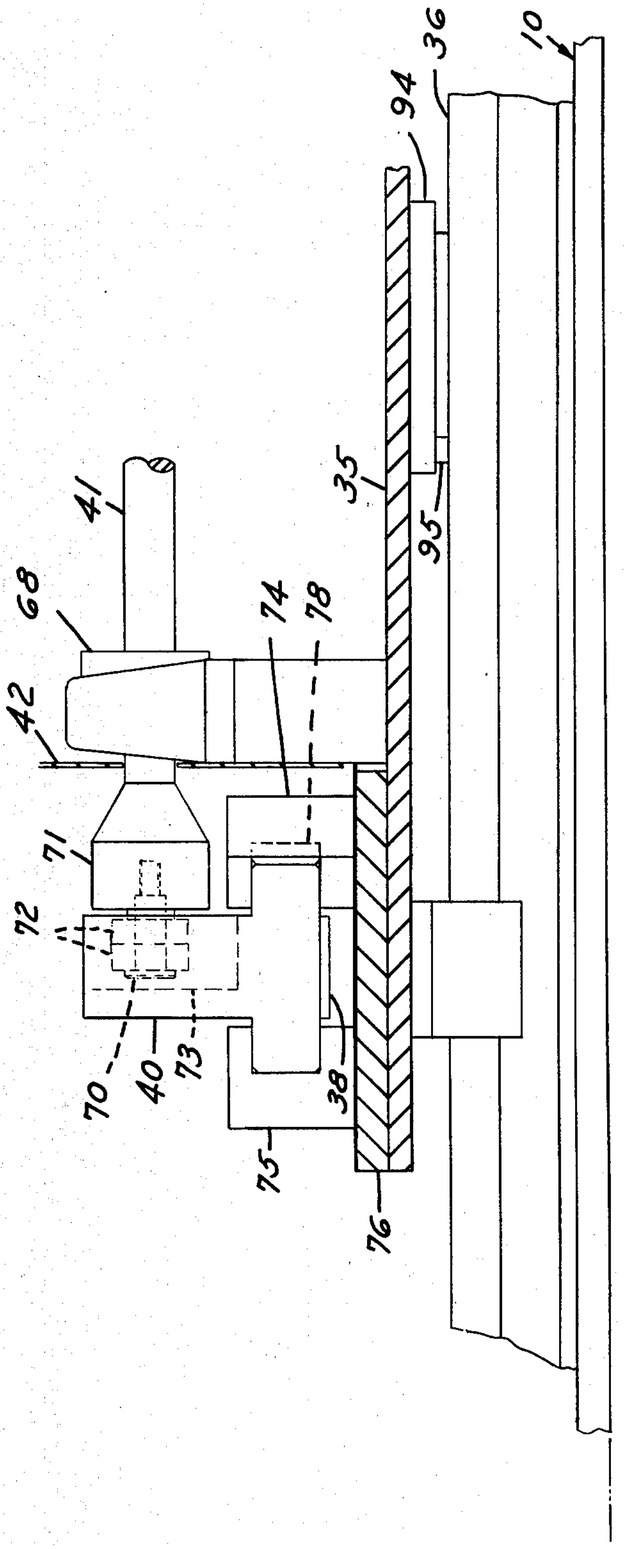
FIG. 6 is an enlarged sectional elevation taken on the line 6—6 of FIG. 5 showing a portion of the slicing table and a reciprocatably driven block which supports the slicing knife.

Details of the means for supporting and reciprocatably driving the slicing knife 38 are shown in FIGS. 5 and 6. A motor 64 mounted on the slicing table 35 is connected to the drive shaft 41 by a belt 65 and pulleys 66, the drive shaft 41 being rotatably supported in bearings 67 and 68. A bearing pin 70 (FIG. 6), eccentrically secured to the enlarged end 71 of the drive shaft 41, supports a pair of drive bearings 72 engaging a vertical slot 73 in the drive block 40, which is slidably supported by guide blocks 74 and 75 mounted on a plate 76. The plate 76 is detachably secured to the table 35 and is readily movable for cleaning, for removal of the drive block 40 and for access to the knife 38 which is secured to the bottom of the drive block, as shown in FIG. 6. Upon reassembly, the base of the pillow block bearing 68 serves as a positive stop to align the plate 76.

These supporting and driving means reciprocate the slicing knife 38 in directions transverse to the direction of linear movement of the slicing table 35 defined by parallel guides 36. Preferably, the drive block 40 is made from an ultra high molecular weight polymer plastic having an extremely low coefficient of friction and the guide blocks 74 and 75 are made of polished stainless steel so that no lubrication is required. Should any wear occur, compensation is provided by a wear strip 78 adjustably mounted in the guide block 74 by screws (not shown) accessible from the side facing the bearing 58.

As shown in FIG. 5, the slicing table 35 is movable linearly on the guides 36 between a non-working position shown in full line and a working position indicated by the broken line showing of the slicing knife 38 abutting the long bone 80 of a ham 81. Operating means, including an operating handle 82 projecting from the right side of the machine as seen by an operator facing the front end 13 thereof, control this linear movement of the slicing table.

Figure 8:
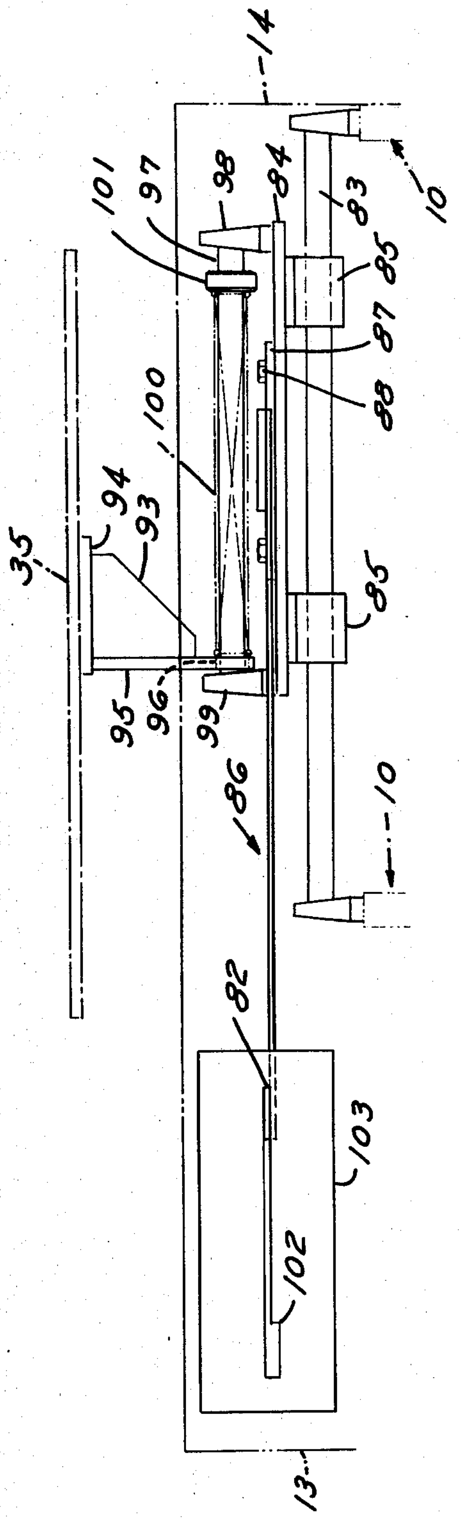

Details of the operating means are shown in FIGS. 7 and 8. A guide shaft 83, mounted on the frame 10 parallel to the slicing table guides 36, supports a handle plate 84 on linear bearings 85. The operating handle 82 forms one end of a handle assembly 86, the other end of which is formed by a plate-like member 87 that overlies the handle plate 84 and is connected thereto by bolts 88, with keys 89 mounted in the handle plate 84 engaging slots 90 in the member 87. This connection enables the working position of the slicing knife 38 to be adjusted, and maintains alignment and rigidity between the handle assembly and handle plate. Alignment is additionally assured by a back-up plate 92 secured to the frame 10 adjacent to the operating handle 82.

Movement of the handle plate 84 by the operating handle 82 is imparted to the slicing table 35 by motion transmitting means interposed therebetween. A motion transmitting member 93 has a rectangular base 94 secured to the slicing table 35 and a depending portion 95 provided with an aperture 96 through which extends a spring guide rod 97. The guide rod 97 is mounted between supports 98 and 99 attached to the handle plate 84 and extends through a spring 100 having one end engaging the portion 95 of the motion transmitting member 93 and the other end engaging a collar 101 which is adjustable longitudinally of the rod 97.

The operating and motion transmitting mechanism is shown in non-working position in FIGS. 7 and 8. When the operating handle 82 is moved to the working position shown in broken line in FIG. 7 and locked in a detent 102 (FIG. 8) of a handle cover plate 103, the accompanying movement of the handle plate 84 is imparted to the slicing table 35 through the spring 100 and the motion transmitting member 93. Consequently, the slicing table is resiliently urged to the working position and the slicing knife 38 is free to follow any irregularities in the bone 80 of the ham 81 and any eccentricity in the rotational movement thereof during a slicing operation. Movement of the operating handle back to non-working position is positively imparted to the slicing table 35 through abutment between the support 99 and the depending portion 95 of the motion transmitting member.

To briefly describe the operating sequence of the machine:

(a) With the upper ham engaging assembly 22 locked in a raised position, the larger end of the ham 81 is mounted on the platter 20 and the long bone 80 is oriented substantially on the longitudinal axis of the feed screw 24. The assembly 22 is unlocked and moved downwardly to place the prongs 19 in engagement with the meat and straddling the shank bone of the ham, then the assembly 22 is locked to the collar 46 by operating the locking handle.

(b) The driving motor 28 is energized "DOWN," causing the feed screw 24 to rotate in a direction such as to cause rotary descending movement from the position shown in FIG. 3 of the motor housing 30, the feed screw 24, the ham engaging members 16 and 18 and the ham mounted therebetween, all in unison.

(c) As the ham is rotating and descending, the operating handle 82 is moved to and locked in working position, automatically supplying power to the knife drive motor 64, and resiliently forcing the reciprocating slicing knife 38 into the meat and against the bone 80.

(d) When the ham is completely sliced, the operating handle is returned to non-working position producing corresponding movement of the slicing table and deactivating the knife drive motor 64. The main driving motor 28 is stopped and the sliced ham is removed by unlocking and raising the assembly 22.

(e) The main driving motor 28 is activated "UP" and stops when the parts have been returned to starting position.

During this operating sequence, the ham is positively mounted and guided along the axis of rotation, with all components involved in the simultaneous rotary and longitudinal movements of the ham moving longitudinally therewith. All movements of the slicing knife 38 are linear and transverse to the axis of rotation; and the linear cutting movement toward the axis of rotation is resiliently controlled to maintain proper cutting depth.

I claim:

1. A ham slicing machine including a frame, ham mounting means, driving means including a first motor connected to a rotatable feed screw carried by the frame for simultaneously rotating and moving the ham mounting means longitudinally of the axis of rotation of the feed screw, and a reciprocatable slicing knife supported by the frame for movement transversely of the axis of rotation of the feed screw into engagement with the ham during the rotating and longitudinal movements thereof, wherein the improvement comprises:

a slicing table;

guide means carried by the frame for slidably supporting the slicing table for linear movement in a direction transverse to the axis of rotation of the feed screw between working and non-working positions relative to the ham;

means including a second motor mounted on the slicing table for supporting and reciprocatably driving the slicing knife in directions transverse to the direction of linear movement of the slicing table;

operating means for moving the slicing table between said working and non-working positions; and motion transmitting means acting between the operating means and the slicing table for resiliently urging the slicing table to the working position in response to movement of the operating means to the working position.

2. A ham slicing machine according to claim 1 wherein the operating means includes a plate slidably supported by the frame for movement parallel to the linear movement of the slicing table, an operating handle connected to the plate and said motion transmitting means are interposed between the plate and the slicing table.

3. A ham slicing machine according to claim 2 wherein the motion transmitting means comprises a motion transmitting member secured to the slicing table, and spring means supported by the plate and engageable with the motion transmitting member.

4. A ham slicing machine according to claim 2 wherein the motion transmitting means comprises a motion transmitting member secured to the slicing table, an abutment carried by the plate and engageable with the motion transmitting member in response to movement of the plate toward the non-working position, a spring, and spring supporting means carried by the plate for transmitting movement of the plate toward the working position to the motion transmitting member through the spring.

5. A ham slicing machine according to claim 4 wherein the spring is a helical compression spring and wherein the spring supporting means comprises a spring guide rod extending through the spring parallel to the direction of movement of the plate, the spring having one end engaging the motion transmitting member and the other end engaging a collar adjustable on the spring guide rod.

6. A ham slicing machine according to claim 1 or 4 wherein the driving means for simultaneously rotating and moving the ham longitudinally of the axis of rotation comprises:

a nut fixedly carried by the frame for supporting the feed screw, a housing supporting the first motor, and guides carried by the frame and mounting the housing for linear movement axially with the feed screw in response to rotation of the feed screw by the first motor.

7. A ham slicing machine according to claim 6 wherein the ham mounting means includes a driven ham-engaging member attached to the feed screw, a non-driven ham engaging member, and supporting means connected to the housing, said supporting means being linearly movable with the housing for positioning the non-driven ham engaging member in spaced relation with the driven ham-engaging member.

8. A ham slicing machine according to claim 7 wherein said supporting means includes a collar, a collar support connected to the housing, a frame-mounted guide engaged by the collar support, a shaft carried by the collar in axial alignment with the feed screw, means rotatably connecting the non-driven ham engaging member to the shaft, and means for adjustably positioning the shaft axially relative to the feed screw.

9. A ham slicing machine according to claim 1 wherein said means for supporting and reciprocatably driving the slicing knife comprises a drive shaft connected to the second motor, an eccentric drive member projecting from one end of the drive shaft, a drive block to which the slicing knife is secured, and guide means detachably secured to the slicing table for reciprocatably supporting the drive block adjacent to said one end of the drive shaft, the drive block having a slot engageable by the eccentric drive member.

10. A ham slicing machine including a frame, a ham mounting means, driving means including a rotatable feed screw carried by the frame for simultaneously rotating and moving the ham mounting means longitudinally of the axis of rotation of the feed screw, and a reciprocatable slicing knife supported by the frame for movement transversely of the axis of rotation of the feed screw into engagement with the ham during the rotating and longitudinal movements thereof, wherein said driving means comprises:

a nut fixedly carried by the frame for supporting the feed screw, a driving motor coupled to the feed screw, a housing supporting the driving motor, and guides carried by the frame and mounting the housing for linear movement axially with the feed screw in response to rotation of the feed screw by the driving motor.

11. A ham slicing machine according to claim 10 wherein the ham mounting means includes a driven ham-engaging member attached to the feed screw, a non-driven ham engaging member, and supporting means connected to the motor supporting housing, said supporting means being linearly movable with the motor supporting housing for positioning the non-driven ham engaging member in spaced relation with the drive ham-engaging member.

* * * * *

UNITED STATES PATENT AND TRADEMARK OFFICE

CERTIFICATE OF CORRECTION

PATENT NO. : 4,374,490

DATED : February 22, 1983

INVENTOR(S) : MICHAEL R. BOYER

It is certified that error appears in the above—identified patent and that said Letters Patent is hereby corrected as shown below:

Column 4, line 24, "58" should read -- 68 --.

Column 8, line 19, "drive" should read -- driven --.

Signed and Sealed this

*Fifth* Day of *July 1983*

[SEAL]

*Attest:*

GERALD J. MOSSINGHOFF

*Attesting Officer* *Commissioner of Patents and Trademarks*